US012756060B2

(12) United States Patent
Woo et al.

(10) Patent No.: US 12,756,060 B2
(45) Date of Patent: Oct. 6, 2026

(54) BATTERY MODULE

(71) Applicant: Samsung SDI Co., Ltd., Yongin-si (KR)

(72) Inventors: Beomjun Woo, Yongin-si (KR); Soodeok Moon, Yongin-si (KR); Jeehoon Jeon, Yongin-si (KR); Taeho Ji, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 10 days.

(21) Appl. No.: 18/381,082

(22) Filed: Oct. 17, 2023

(65) Prior Publication Data

US 2024/0332722 A1 Oct. 3, 2024

(30) Foreign Application Priority Data

Mar. 31, 2023 (KR) ........................ 10-2023-0043191

(51) Int. Cl.

| | |
|---|---|
| ***H01M 50/358*** | (2021.01) |
| ***H01M 10/613*** | (2014.01) |
| ***H01M 10/653*** | (2014.01) |
| ***H01M 10/6561*** | (2014.01) |
| ***H01M 10/658*** | (2014.01) |

(Continued)

(52) U.S. Cl.

CPC ....... *H01M 50/358* (2021.01); *H01M 10/613* (2015.04); *H01M 10/653* (2015.04); *H01M 10/6561* (2015.04); *H01M 10/658* (2015.04); *H01M 50/209* (2021.01); *H01M 50/505* (2021.01)

(58) Field of Classification Search

None

See application file for complete search history.

(56) References Cited

U.S. PATENT DOCUMENTS 11,217,857 B2 1/2022 Lindstrom et al.
2012/0164490 A1 6/2012 Itoi et al.
2014/0113167 A1 4/2014 Itoi et al.

(Continued)

FOREIGN PATENT DOCUMENTS

KR 10-1269721 B1 5/2013
KR 10-2021-0029130 A 3/2021

(Continued)

OTHER PUBLICATIONS

Partial European Search Report for Application No. 24158924.1, mailed Aug. 22, 2024, 13 pages.

(Continued)

*Primary Examiner* — Nathanael T Zemui

(74) *Attorney, Agent, or Firm* — Womble Bond Dickinson (US) LLP

(57) ABSTRACT

A battery module includes: battery cells arranged in a first direction that include vent portions; and a first module case extending in the first direction and supporting the battery cells. The first module case includes a first vent flow path communicating with the vent portions, and projecting away from the battery cells and extending in the first direction, and second vent flow paths spaced from each other in a second direction traversing the first direction, extending in the first direction to support the battery cells, and directly communicating with the first vent flow path. The first vent flow path is between the second vent flow paths.

18 Claims, 9 Drawing Sheets

(51) Int. Cl.
*H01M 50/209* (2021.01)
*H01M 50/505* (2021.01)

(56) References Cited

U.S. PATENT DOCUMENTS

| | | | | |
|---|---|---|---|---|
| 2021/0074982 | A1 | 3/2021 | Kim et al. | |
| 2021/0075075 | A1* | 3/2021 | Kim | H01M 10/613 |
| 2021/0265700 | A1* | 8/2021 | Egashira | H01M 50/262 |
| 2022/0223972 | A1* | 7/2022 | Zhu | H01M 50/367 |
| 2023/0070894 | A1 | 3/2023 | Li et al. | |
| 2023/0223649 | A1* | 7/2023 | Lee | H01M 50/358 429/82 |
| 2023/0231260 | A1 | 7/2023 | Hu et al. | |
| 2023/0231263 | A1* | 7/2023 | Li | H01M 50/358 429/53 |
| 2023/0318130 | A1 | 10/2023 | Shin et al. | |
| 2023/0361402 | A1* | 11/2023 | Lee | H01M 50/209 |
| 2024/0088515 | A1 | 3/2024 | Lee et al. | |
| 2024/0213573 | A1 | 6/2024 | Qian et al. | |
| 2024/0283085 | A1 | 8/2024 | Lee et al. | |

FOREIGN PATENT DOCUMENTS

| | | | | | |
|---|---|---|---|---|---|
| KR | 2022106534 | A | * | 7/2022 | H01M 50/204 |
| KR | 10-2022-0168918 | A | | 12/2022 | |
| KR | 10-2022-0168919 | A | | 12/2022 | |
| KR | 2023008524 | A | * | 1/2023 | A62C 3/16 |
| KR | 10-2023-0060517 | A | | 5/2023 | |
| KR | 10-2023-0108139 | A | | 7/2023 | |
| KR | 2024020278 | A | * | 2/2024 | H01M 10/60 |
| WO | WO-2020003800 | A1 | * | 1/2020 | B60L 50/64 |

OTHER PUBLICATIONS

Korean Office action for Application No. 10-2023-0043191, mailed Aug. 25, 2024, 8 pages.
Extended European Search Report for Application No. 24158924.1, dated Dec. 20, 2024, 12 pages.
Korean Notice of Allowance for Application No. 10-2023-0043191, dated Feb. 11, 2025, 3 pages.

* cited by examiner

BATTERY MODULE

CROSS-REFERENCE TO RELATED APPLICATION

The present application claims priority to and the benefit of Korean Patent Application No. 10-2023-0043191, filed on Mar. 31, 2023, in the Korean Intellectual Property Office, the entire disclosure of which are incorporated herein by reference.

BACKGROUND

1. Field

The present disclosure relates to a battery module.

2. Description of the Related Art

In general, a battery module includes battery cells connected to each other.

A conventional battery module includes battery cells and a module case for receiving the battery cells.

However, the module case of the conventional battery module exposes vent portions of the battery cells and supports the battery cells, and therefore the module case of the conventional battery module is not designed to adequately discharge the gas generated during a thermal runaway event in one or more of the battery cells.

SUMMARY

The present disclosure has been made in an effort to provide a battery module for easily discharging gas generated by a vent portion of a battery cell during a thermal runaway event in one or more of the battery cells and trapping particles included in the gas.

The present disclosure has been made in another effort to provide a battery module for easily transporting battery cells, assembling the same, and protecting the same from external impacts.

An embodiment of the present disclosure provides a battery module including: battery cells arranged in a first direction and including vent portions; and a first module case extending in the first direction and supporting the battery cells. The first module case includes a first vent flow path communicating with the vent portions, and projecting away from the battery cells and extending in the first direction, and second vent flow paths spaced from each other in a second direction traversing (crossing) the first direction, extending in the first direction to support the battery cells, and directly communicating with the first vent flow path. The first vent flow path is between the second vent flow paths.

Each of the second vent flow paths may include a first sub flow path directly communicating with the first vent flow path and extending in the first direction; and a second sub flow path spaced from the first sub flow path in the second direction, extending in the first direction, and directly communicating with the first sub flow path.

Each of the second vent flow paths may further include a first cell barrier between the first vent flow path and the first sub flow path, and the first cell barrier may include first through-holes connecting the first vent flow path and the first sub flow path.

Each of the second vent flow paths may further include a second cell barrier between the first sub flow path and the second sub flow path, and the second cell barrier may include second through-holes connecting the first sub flow path and the second sub flow path.

The first through-holes may not overlap the second through-holes in the second direction.

Each of the second vent flow paths may further include a first cover for covering the first sub flow path and the second sub flow path and supporting the battery cells.

Each of the second vent flow paths may include a gas flow path directly communicating with the first vent flow path and extending in the first direction, and a cooling flow path spaced from the gas flow path in a third direction traversing the first direction and the second direction, extending in the first direction, and not communicating with the first vent flow path and the gas flow path.

The cooling flow path may be between the gas flow path and the battery cells.

Each of the second vent flow paths may further include a third cell barrier between the first vent flow path and the gas flow path, and the third cell barrier may include third through-holes connecting the first vent flow path and the gas flow path.

Each of the second vent flow paths may further include a barrier between the gas flow path and the cooling flow path, and the barrier may separate the gas flow path and the cooling flow path.

Each of the second vent flow paths may further include a second cover covering the cooling flow path and supporting the battery cells.

The battery module may further include a battery insulating sheet between the battery cells and the first module case and including sheet through-holes corresponding to the vent portions.

The battery module may further include a heat insulating sheet between the battery insulating sheet and the first module case and attached to the first vent flow path.

The battery module may further include a second module case coupled to the first module case with the battery cells between the first module case and the second module case.

The battery module may further include a heat transmitting sheet between the battery cells and the second module case.

The battery module may further include a first end plate and a second end plate coupled to the first module case and the second module case with the battery cells therebetween.

One of the first end plate or the second end plate may include a first module vent portion communicating with one of the second vent flow paths, and another of the first end plate or the second end plate may include a second module vent portion communicating with another of the second vent flow paths.

The battery cells may further include long sides and short sides, and the vent portions may be on the long sides of the battery cells.

The battery cells may further include terminals on the short sides of the battery cells, and may further include a busbar connecting the terminals of the battery cells.

The battery module may further include a busbar cover covering the busbar.

According to various embodiments of the present disclosure, a battery module for easily discharging gas generated by a vent portion of a battery cell during a thermal runaway event in one or more of the battery cells and trapping particles included in the gas is provided.

Further, the battery module for easily transporting battery cells, assembling the same, and protecting the same from external impacts is provided.

DETAILED DESCRIPTION

The present disclosure will be described more fully hereinafter with reference to the accompanying drawings, in which embodiments of the disclosure are shown. As those skilled in the art would realize, the described embodiments may be modified in various different ways, all without departing from the scope of the present disclosure.

Unless explicitly described to the contrary, the word "comprise", and variations such as "comprises" or "comprising", will be understood to imply the inclusion of stated elements but not the exclusion of any other elements.

A battery module according to an embodiment will now be described with reference to FIG. 1 to FIG. 5.

Figure 1:
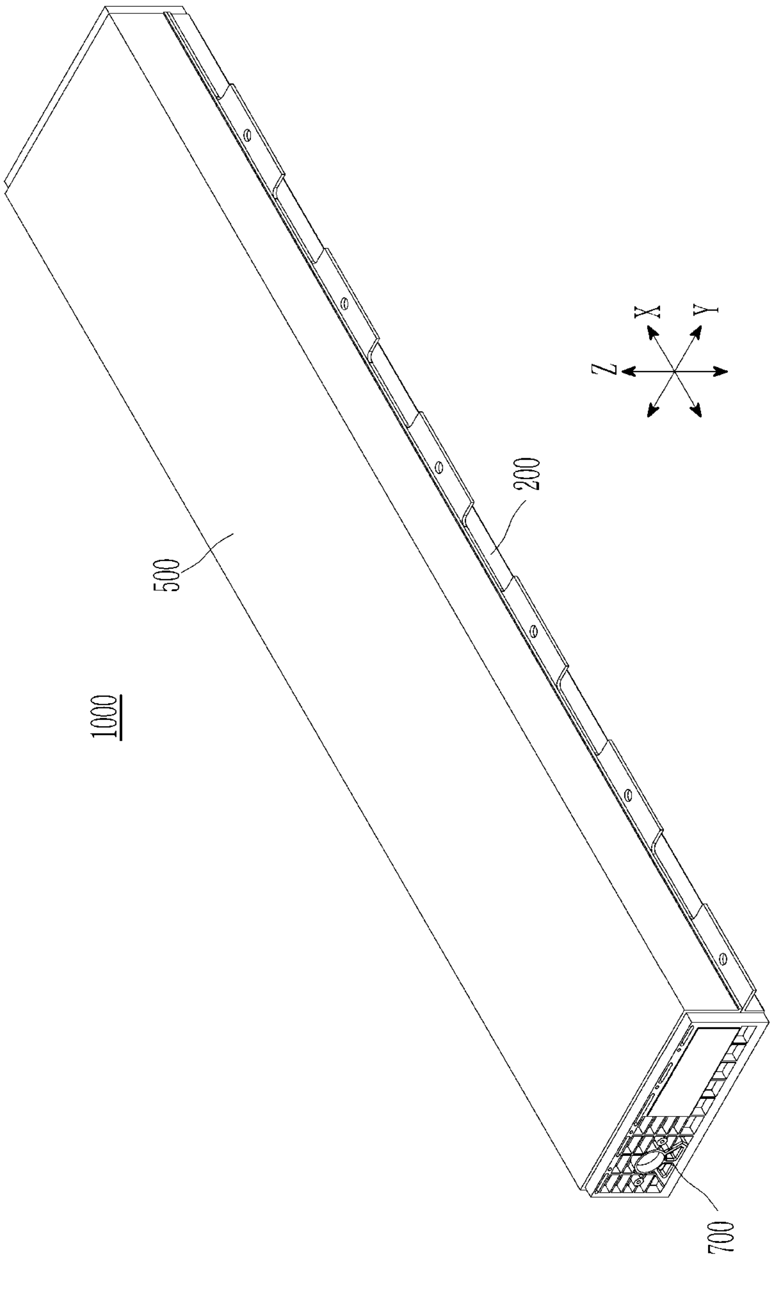
FIG. 1 shows a perspective view of a battery module according to an embodiment of the present disclosure.
Figure 2:
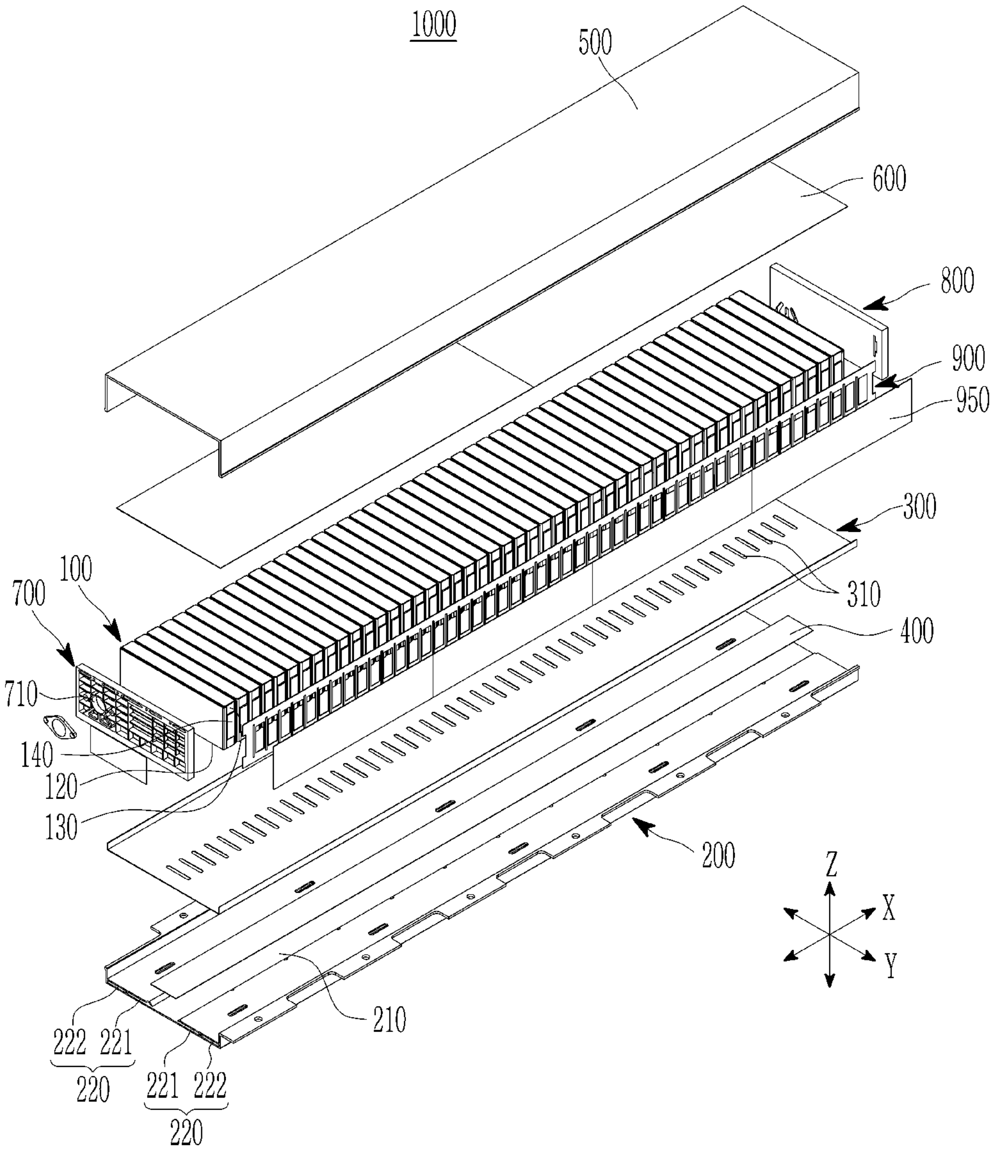
FIG. 2 shows an exploded perspective view of a battery module according to an embodiment of the present disclosure.

FIG. 1 shows a perspective view of a battery module according to an embodiment of the present disclosure. FIG. 2 shows an exploded perspective view of a battery module according to an embodiment of the present disclosure.

Referring to FIG. 1 and FIG. 2, the battery module 1000 may include battery cells 100, a first module case 200, a battery insulating sheet 300, a heat insulating sheet 400, a second module case 500, a heat transmitting sheet 600, a first end plate 700, a second end plate 800, a busbar 900, and a busbar cover 950.

Figure 3:
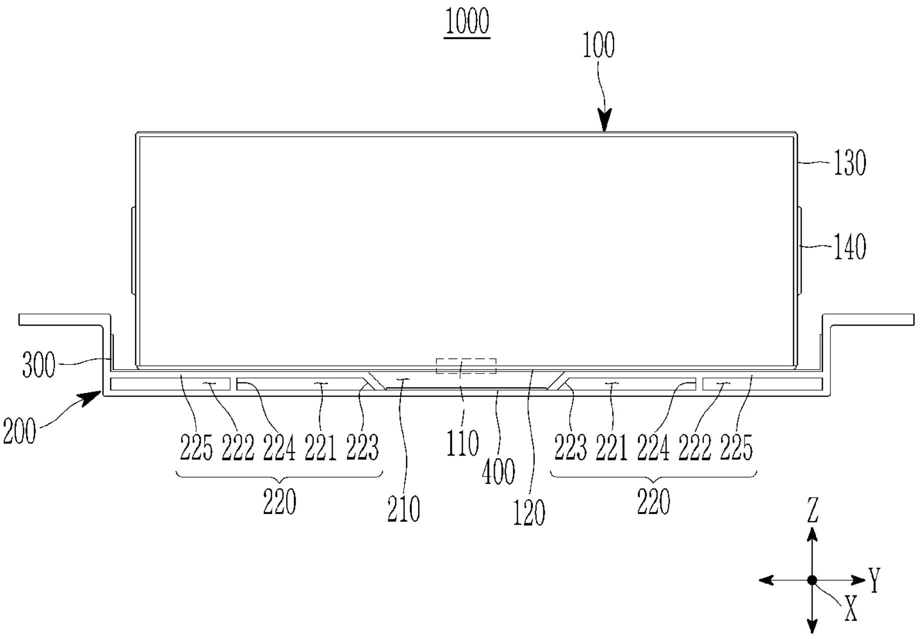
FIG. 3 shows a front view of a battery cell and a first module case of a battery module according to an embodiment of the present disclosure.
Figure 4:
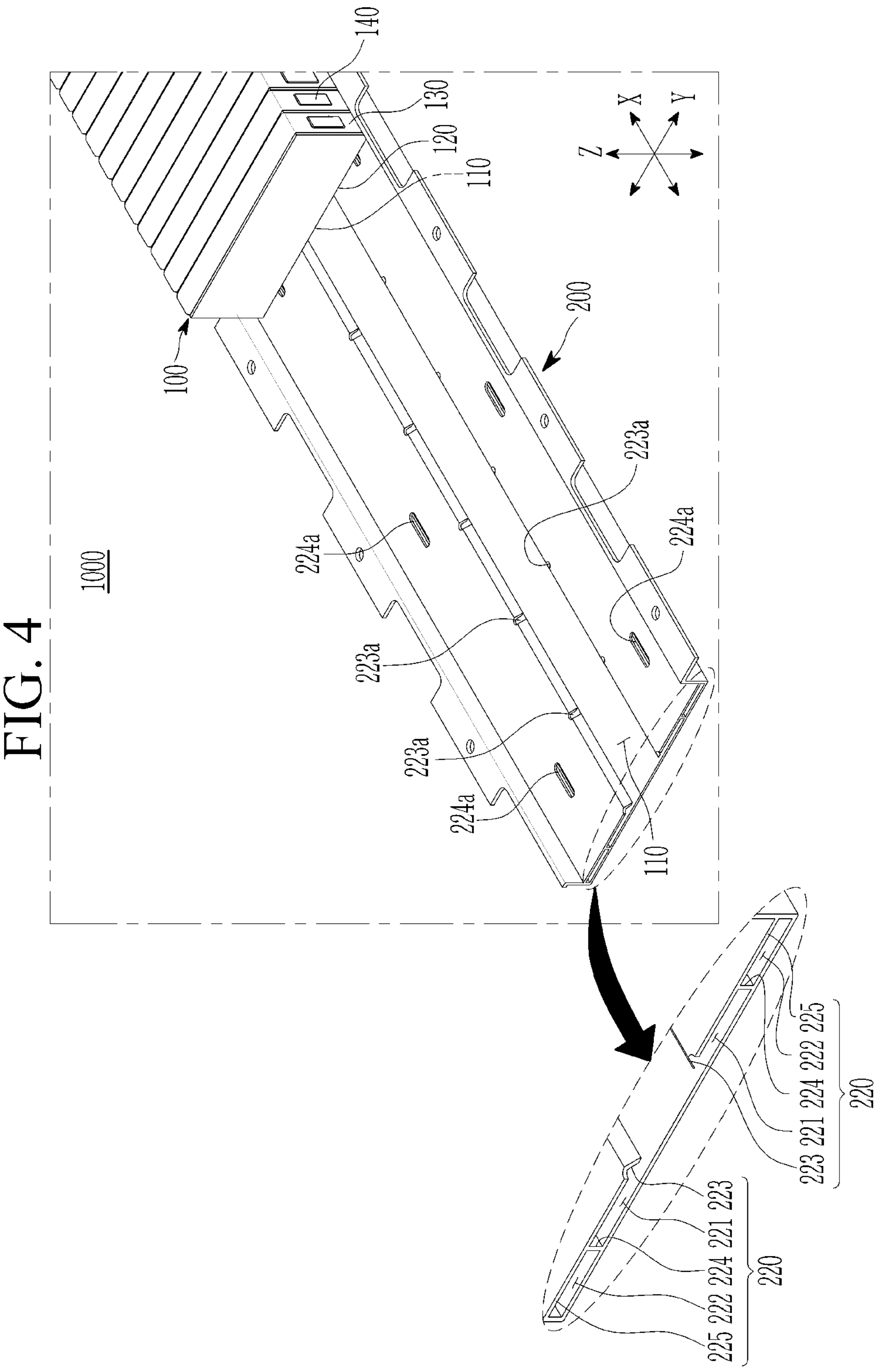
FIG. 4 shows a perspective view battery cells and a first module case of a battery module according to an embodiment of the present disclosure.

FIG. 3 shows a front view of a battery cell and a first module case of a battery module according to an embodiment of the present disclosure. FIG. 4 shows a perspective view of battery cells and a first module case of a battery module according to an embodiment of the present disclosure.

Referring to FIG. 2 to FIG. 4, the battery cells 100 may be arranged in a first direction (X) and may be electrically connected to each other. The battery cells 100 may be various types of known rechargeable batteries that may be repeatedly charged and discharged. For example, the battery cells 100 may include a lithium ion battery, and without being limited thereto, they may include a lithium polymer battery.

In the illustrated embodiments, the first direction (X), a second direction (Y), and a third direction (Z) may respectively represent directions traversing (crossing) each other, and the directions traversing (crossing) each other may represent directions that are perpendicular to each other (the first, second, and third directions may be mutually orthogonal), but the present disclosure is not limited thereto.

The battery cells 100 may each include a vent portion 110, a long side 120, a short side 130, and a terminal 140.

The vent portion 110 may be disposed on the long side 120 of the battery cell 100, and may be a passage through which inner gas is discharged to the outside of the battery cell 100 if a thermal runaway is generated (or occurs) inside the battery cell 100 because of internal or external factors. The vent portion 110 may include various known vent means or features. The vent portions 110 included in the battery cells 100 may be arranged in the first direction (X), and the respective vent portions 110 may be disposed on the long sides 120 of the battery cells 100.

The long side 120 may be a surface that is longer than the short side 130, but the present disclosure is not limited thereto.

The short side 130 may be a surface that is shorter than the long side 120, but the present disclosure is not limited thereto.

The battery cell 100 forms a rectangular shape by the short side 130 and the long side 120, and without being limited thereto, the battery cell according to another embodiment may have various known shapes such as a circle, an oval, or a polygon.

The terminal 140 may be located on the short side 130 of the battery cell 100, and the terminals 140 of the battery cells 100 may be electrically connected to each other by the busbar 900. The terminals 140 may be located on the respective short sides 130 of the battery cells 100. The terminals 140 may have various known terminal structures.

The first module case 200 may extend in the first direction (X) in which the battery cells 100 are arranged and may support the battery cells 100. The first module case 200 may support the long sides 120 of the battery cells 100, and without being limited thereto, it may further include a support means or features for supporting the short sides 130 of the battery cells 100.

The first module case 200 may include a first vent flow path 210 and second vent flow paths 220.

The first vent flow path 210 may directly communicate with the vent portions 110 of the battery cells 100, and may dent (project or recess) and extend in the first direction (X). The first vent flow path 210 may be recessed in the third direction (Z) (away from the battery cells 100) traversing (crossing) the first direction (X) and the second direction (Y) and may extend in the first direction (X).

The second vent flow paths 220 may be spaced from each other with the first vent flow path 210 therebetween in the second direction (Y) traversing (crossing) the first direction (X). The second vent flow paths 220 may extend in the first direction (X) and may support the battery cells 100. The second vent flow paths 220 directly communicate with the first vent flow path 210. The second vent flow paths 220 include two second vent flow paths 220, and without being limited thereto, they may include at least three second vent flow paths 220. For example, the two second vent flow paths 220 may be spaced from each other in the second direction (Y) with the first vent flow path 210 therebetween and the two second vent flow paths 220 may extend in the first direction (X).

The second vent flow paths 220 may include a first sub flow path 221, a second sub flow path 222, a first cell barrier 223, a second cell barrier 224, and a first cover 225.

The first sub flow path 221 may directly communicate with the first vent flow path 210 and may extend in the first direction (X). The first sub flow path 221 may be located between the first vent flow path 210 and the second sub flow path 222 in the second direction (Y). The first sub flow path 221 may directly communicate with the first vent flow path 210 and the second sub flow path 222 and the first sub flow path 221 may be between the first vent flow path 210 and the second sub flow path 222.

The second sub flow path 222 may be spaced from the first sub flow path 221 in the second direction (Y) and may extend in the first direction (X). The second sub flow path 222 may directly communicate with the first sub flow path 221, and may communicate with the first vent flow path 210 through the first sub flow path 221.

The first cell barrier 223 may be located between the first vent flow path 210 and the first sub flow path 221. The first cell barrier 223 may be located between the first vent flow path 210 and the first sub flow path 221 and may extend in the first direction (X). The first cell barrier 223 may define the shape (or at least the shapes of the sides) of the first vent flow path 210, but the shape of the first vent flow path 210 is not limited herein. The first cell barrier 223 may include first through-holes **223*a*** spaced from each other in the first direction (X).

The first through-holes **223*a* may be passages for connecting the first vent flow path 210 and the first sub flow path 221. The first through-holes 223*a* may be various types of openings such as a circle, an oval, or a polygon shaped opening. The first through-holes 223*a* may not overlap second through-holes 224*a*** in the second direction (Y).

The second cell barrier 224 may be located between the first sub flow path 221 and the second sub flow path 222. The second cell barrier 224 may be located between the first sub flow path 221 and the second sub flow path 222 and may extend in the first direction (X). The second cell barrier 224 may define the shapes of the first sub flow path 221 and the second sub flow path 222, but the shapes of the first sub flow path 221 and the second sub flow path 222 are not limited herein. The second cell barrier 224 may include second through-holes **224*a*** spaced from each other in the first direction (X).

The second through-holes **224*a* are passage for connecting the first sub flow path 221 and the second sub flow path 222. The second through-holes 224*a* may be various types of openings such as a circle, an oval, or a polygon shaped opening. The second through-holes 224*a* may not overlap the first through-holes 223*a*** in the second direction (Y).

The first cover 225 covers the first sub flow path 221 and the second sub flow path 222. The first cover 225 may extend in the first direction (X) and may cover the first sub flow path 221 and the second sub flow path 222. In the illustrated embodiment, the first cover 225 extends in the x-y plane. The first cover 225 may support the battery cells 100. The first cover 225, the first cell barrier 223, and the second cell barrier 224 may define the first vent flow path 210 and the second vent flow path 220, but the present disclosure is not limited thereto.

Gas generated by the battery cell 100 in which a thermal runaway is generated or occurring from among the battery cells 100 is discharged to the outside of the battery module 1000 through the first vent flow path 210 and the second vent flow path 220 of the first module case 200.

Referring to FIG. 2, the battery insulating sheet 300 may be located between the battery cells 100 and the first module case 200. The battery insulating sheet 300 may be an insulating means (an insulating mechanism) between the battery cells 100 and the first module case 200, but the present disclosure is not limited thereto. The battery insulating sheet 300 may include sheet through-holes 310 penetrating the insulating sheet 300 and corresponding to the vent portions 110 of the battery cells 100. The sheet through-holes 310 may be spaced from each other in the first direction (X).

The heat insulating sheet 400 may be located between the battery insulating sheet 300 and the first module case 200. The heat insulating sheet 400 may be attached to a bottom of the first vent flow path 210. The heat insulating sheet 400 may reinforce the first module case 200. If the gas generated by the battery cell 100 in which a thermal runaway is generated or occurring from among the battery cells 100 passes through the first vent flow path 210, the heat insulating sheet 400 may minimize deformation of the first module case 200 (which may occur due to a high heat and a high pressure caused by gas) and may minimize deformation of the first vent flow path 210 and the second vent flow path 220.

The second module case 500 may be combined (coupled) to the first module case 200 with the battery cells 100 therebetween. The second module case 500 may be combined (coupled) to the first module case 200, the first end plate 700, and the second end plate 800 with the battery cells 100 therebetween so the battery cells 100 are completely covered by the first module case 200, the second module case 500, the first end plate 700, and the second end plate 800.

The second module case 500 may be combined (coupled) to the first module case 200, the second module case 500, the first end plate 700, and the second end plate 800 by welding, and without being limited thereto, they may be combined (coupled) to each other by various other known manners or combination means.

The second module case 500 and the first module case 200 may include various types of assembling means assembled with a battery pack including battery modules or a vehicle.

The heat transmitting sheet 600 may be located between the battery cells 100 and the second module case 500. The heat transmitting sheet 600 may contact the battery cells 100 and the second module case 500 and may exchange heat with the battery cells 100 and the second module case 500. The heat transmitting sheet 600 may increase a cooling effect of the battery cells 100. The heat transmitting sheet 600 may include various types of known cooling means or mechanisms.

Figure 5:
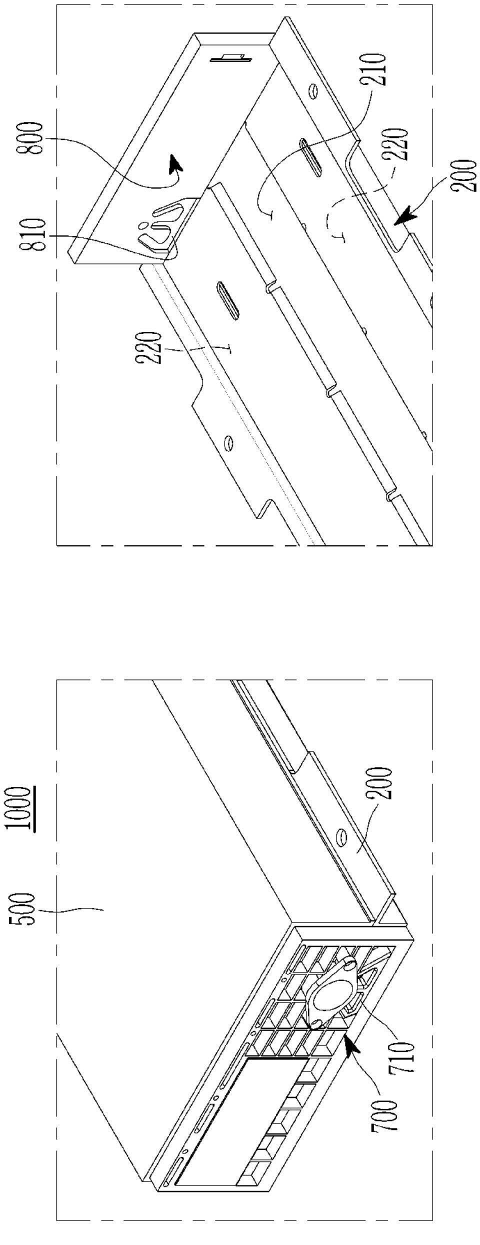
FIG. 5 shows a perspective view of a portion on which a first end plate of a battery module according to an embodiment of the present disclosure is disposed and another portion on which a second end plate is disposed.

FIG. 5 shows a perspective view of a portion on which a first end plate of a battery module according to an embodiment is disposed and another portion on which a second end plate is disposed.

Referring to FIG. 5 and FIG. 2, the first end plate 700 may be combined (coupled) to the first module case 200 and the second module case 500 with the battery cells 100 between the first module case 200 and the second module case 500. The first end plate 700 may include a first module vent portion 710 for communicating with one of the second vent flow paths 220. The first module vent portion 710 may communicate with at least one of the second vent flow paths 220. The first module vent portion 710 may discharge the gas generated by the battery cell 100 in which a thermal runaway is generated or occurring through the second vent flow path 220 to the outside of the battery module 1000. The first module vent portion 710 may be a passage for communicating with at least one of the second vent flow paths 220 and discharging the gas generated by the battery cell 100 in which a thermal runaway is generated through the second vent flow path 220 to the outside of the battery module 1000, although the present disclosure is not limited thereto.

The second end plate 800 may be spaced from the first end plate 700 with the battery cells 100 therebetween and may be combined (coupled) to the first module case 200 and the second module case 500. The second end plate 800 may include a second module vent portion 810 for communicating with one of the second vent flow paths 220. The second module vent portion 810 may communicate with at least one of the second vent flow paths 220. The second module vent portion 810 may discharge the gas generated by the battery cell 100 in which a thermal runaway is generated through the second vent flow path 220 to the outside of the battery module 1000. The second module vent portion 810 may be a passage for communicating with at least one of the second vent flow paths 220 and discharging the gas generated by the battery cell 100 in which a thermal runaway is generated through the second vent flow path 220 to the outside of the battery module 1000, although the present disclosure is not limited thereto.

For example, one of the first end plate 700 and the second end plate 800 may include a first module vent portion 710 communicating with one of the second vent flow paths 220, and the other one of the first end plate 700 and the second end plate 800 may include a second module vent portion 810 communicating with the other of the second vent flow paths 220.

In one or more embodiments, various known battery management modules (BMM) may be mounted on at least one of the first end plate 700 and the second end plate 800, and the battery management module may manage the battery cells 100 through the busbar 900.

Referring to FIG. 2, the busbar 900 may connect the terminals 140 of the battery cells 100. The busbar 900 may include a flexible printed circuit board (FPCB) for sensing a state of the busbar, although the present disclosure is not limited thereto.

The busbar cover 950 may be disposed between the busbar 900 and the second module case 500. The busbar cover 950 may cover the busbar 900 and may be an insulating means or mechanism between the busbar 900 and the second module case 500, although the present disclosure is not limited thereto.

An effect of a battery module according to an embodiment will now be described with reference to FIG. 6 and FIG. 7.

Figure 6:
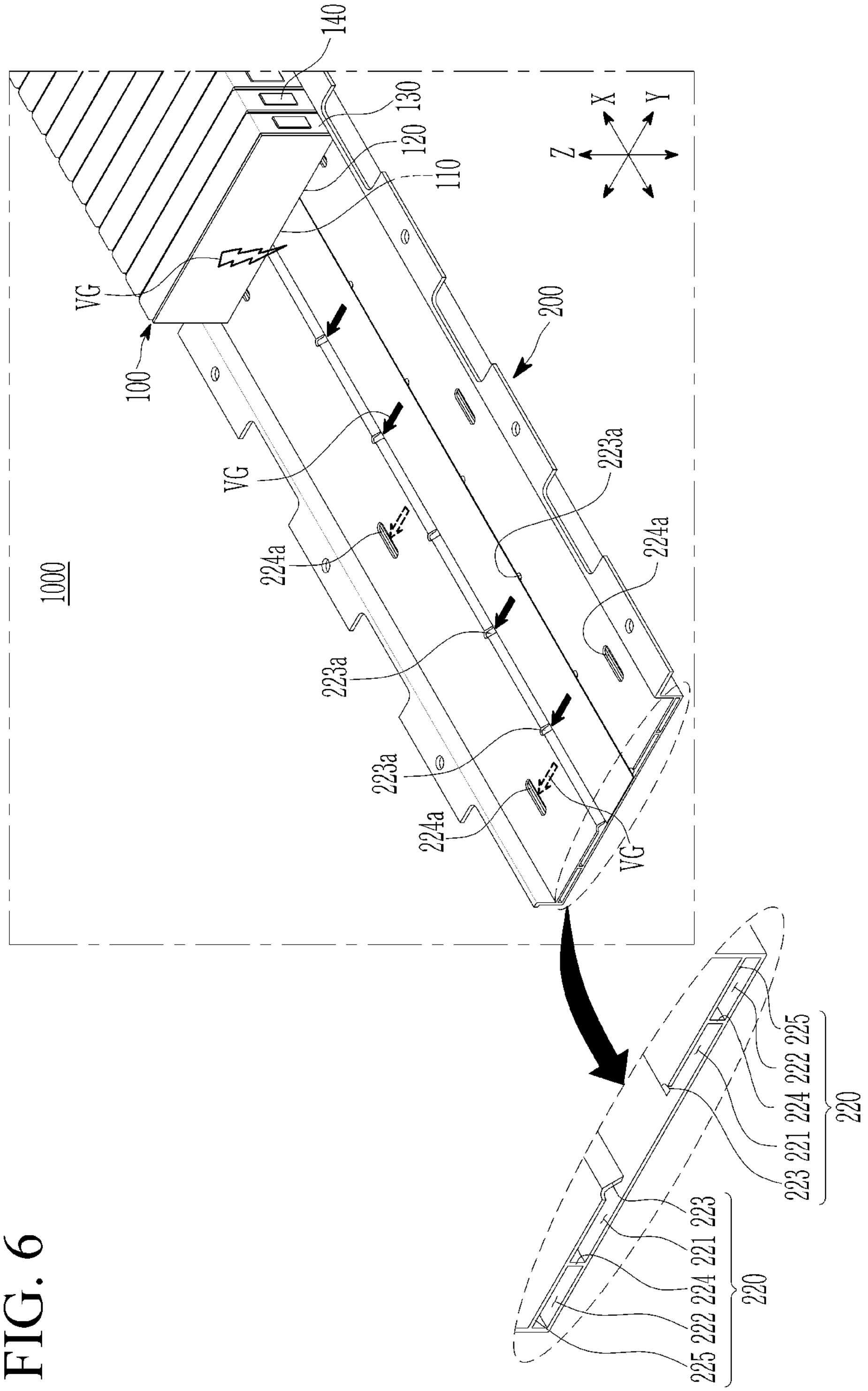
FIG. 6 shows a perspective view in which a thermal runaway is generated in some of the battery cells of a battery module according to an embodiment of the present disclosure.

FIG. 6 shows a perspective view in which a thermal runaway is generated or occurring in some of battery cells of a battery module according to an embodiment. FIG. 7 shows a path for discharging gas generated by a thermal runaway of a battery cell in a battery module according to an embodiment.

Figure 7:
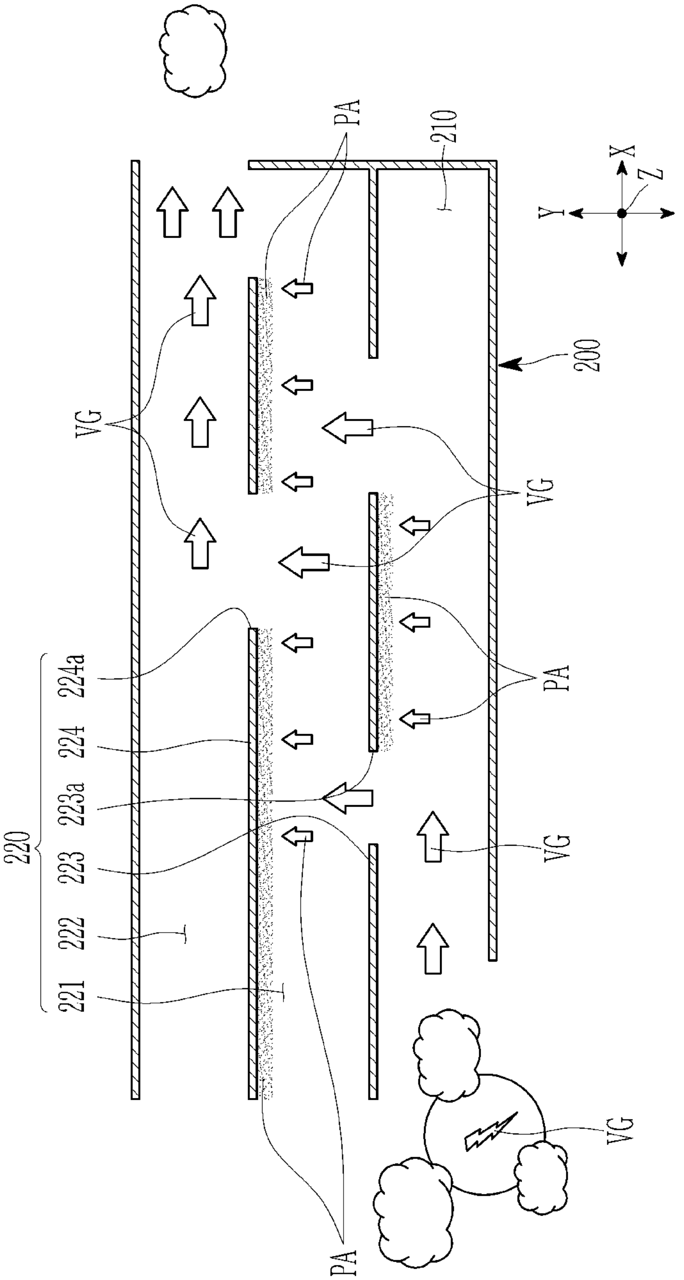
FIG. 7 shows a path for discharging gas generated by a thermal runaway of a battery cell in a battery module according to an embodiment of the present disclosure.

Referring to FIG. 6 and FIG. 7, the gas VG generated by the battery cell 100 in which a thermal runaway is generated (or occurring) from among the battery cells 100 is discharged to the outside of the battery module 1000 through the first vent flow path 210 and the second vent flow path 220 of the first module case 200.

In one or more embodiments, the gas VG generated by the battery cell 100 in which a thermal runaway is generated (or occurring) may move to the first vent flow path 210 from the vent portion 110 of the battery cell 100. The gas VG may then move in the first direction (X), may move in the second direction (Y) through the first through-holes 223*a* of the first cell barrier 223, and may move to the first sub flow path 221 of the second vent flow path 220. The gas VG may then move in the first direction (X), may move in the second direction (Y) through the second through-holes 224*a* of the second cell barrier 224, and may move to the second sub flow path 222 of the second vent flow path 220. The gas VG may then move in the first direction (X) and may be discharged to the outside of the battery module 1000. The gas VG generated by the vent portion 110 of the battery cell 100 in which a thermal runaway is generated (or occurring) may pass through the first sub flow path 221 and the second sub flow path 222 of the first vent flow path 210 and the second vent flow path 220, and because the first through-holes 223*a* do not overlap the second through-holes 224*a* in the second direction (Y), the gas VG is cooled by the first cell barrier 223 and the second cell barrier 224, and particles PA included in the gas VG are attached to the first cell barrier 223 and the second cell barrier 224 and are trapped (e.g., adhered) to the first cell barrier 223 and the second cell barrier 224 so the particles PA are separated from the gas VG. In this manner, the gas VG generated by the vent portion 110 of the battery cell 100 in which a thermal runaway is generated may be easily cooled by passing through the first vent flow path 210 and the second vent flow path 220 of the first module case 200, and the particles PA may be separated from the gas VG before the gas VG is discharged to the outside of the battery module 1000.

For example, the battery module 1000 for easily discharging the gas VG generated by the vent portion 110 of the battery cell 100 in which a thermal runaway is generated (or occurring) to the outside corresponding to the thermal runaway of the battery cells 100 to the outside and trapping the particles PA included in the gas VG is provided.

Further, as the first module case 200, the second module case 500, the first end plate 700, and the second end plate 800 are combined (coupled) to each other while completely covering the battery cells 100, the battery module for easily conveying the battery cells, assembling the same, and protecting the same from external impacts is provided.

A battery module according to another embodiment will now be described with reference to FIG. 8 and FIG. 9. The battery module according to another embodiment that is different from the battery module according to an embodiment described above will now be described.

Figure 8:
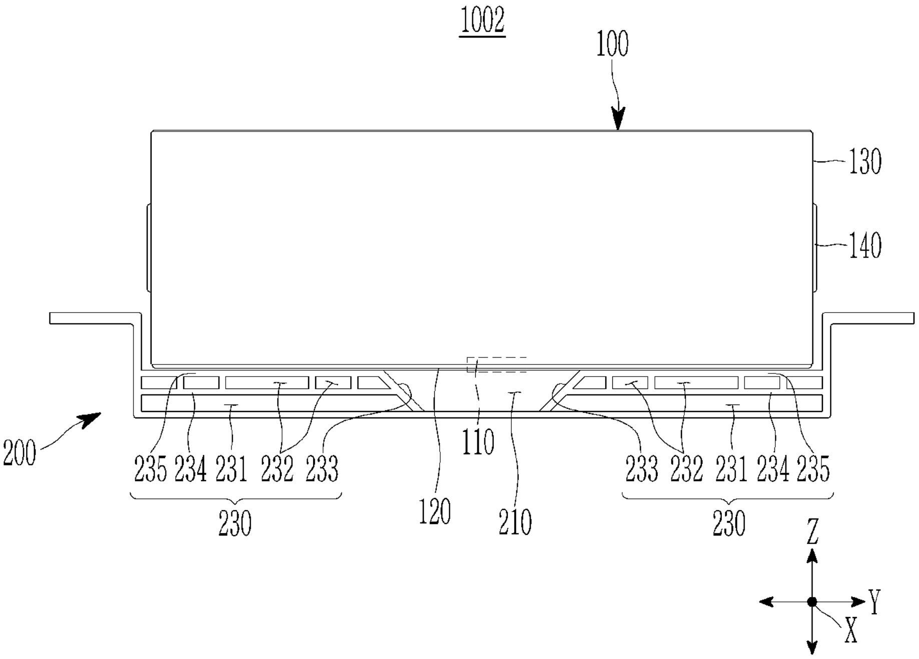
FIG. 8 shows a front view on a battery cell and a first module case of a battery module according to another embodiment of the present disclosure.

FIG. 8 shows a front view of a battery cell and a first module case of a battery module according to another embodiment of the present disclosure. FIG. 9 shows a perspective view of battery cells and a first module case of a battery module according to an embodiment of the present disclosure.

Figure 9:
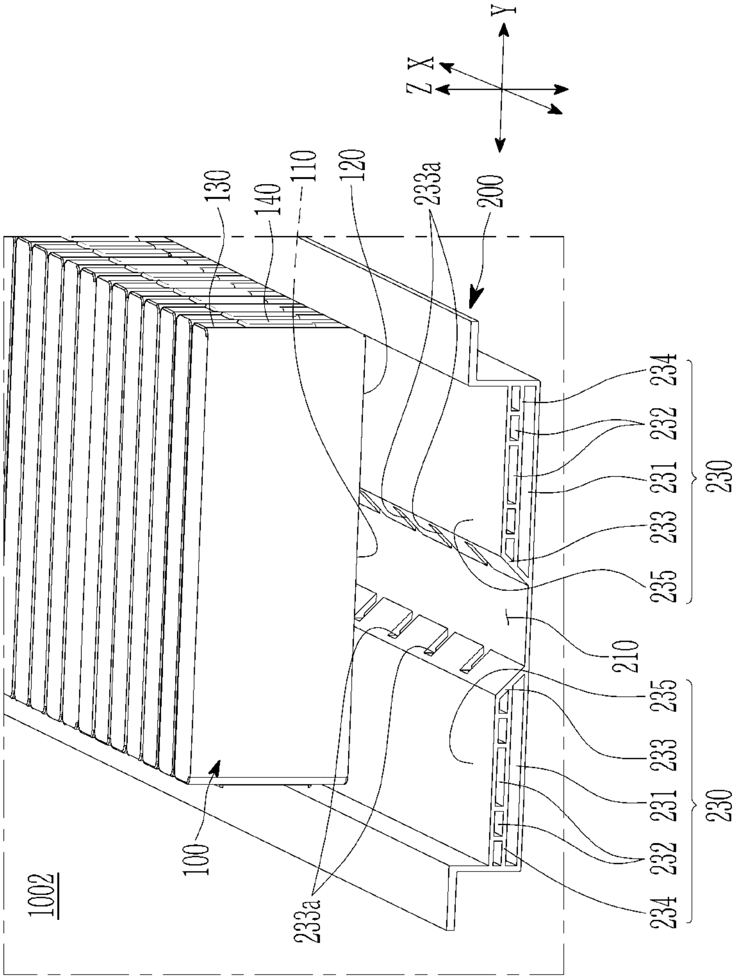
FIG. 9 shows a perspective view of battery cells and a first module case of a battery module according to another embodiment of the present disclosure.

Referring to FIG. 8 and FIG. 9, the battery module 1002 may include battery cells 100 and a first module case 200. The battery module 1002 according to an embodiment may further include the battery insulating sheet, the heat insulating sheet, the second module case, the heat transmitting sheet, the first end plate, the second end plate, the busbar, and the busbar cover described above according to an embodiment of the present disclosure.

The first module case 200 may include a first vent flow path 210 and second vent flow paths 230.

The first vent flow path 210 may directly communicate with the vent portions 110 of the battery cells 100, and may dent (project or recess) and extend in the first direction (X). The first vent flow path 210 may dent (project or recess) in the third direction (Z) traversing (crossing) the first direction (X) and the second direction (Y) and may extend in the first direction (X).

The second vent flow paths 230 may be spaced from each other in the second direction (Y) traversing (crossing) the first direction (X) and the first vent flow path 210 may be between the second vent flow paths 230. The second vent flow paths 230 may extend in the first direction (X) and may support the battery cells 100. The second vent flow paths 230 may directly communicate with the first vent flow path 210. The second vent flow paths 230 may include two second vent flow paths 230, but the present disclosure is not limited thereto, and in one or more embodiments there may be at least three second vent flow paths 230. For example, the two second vent flow paths 230 may be spaced from each other in the second direction (Y) with the first vent flow path 210 therebetween and the two second vent flow paths 230 may extend in the first direction (X).

Each of the second vent flow paths 230 may include a gas flow path 231, a cooling flow path 232, a third cell barrier 233, a barrier 234, and a second cover 235.

The gas flow path 231 may directly communicate with the first vent flow path 210 and may extend in the first direction (X). The gas flow path 231 neighbors (borders or is adjacent to) the first vent flow path 210 in the second direction (Y). The gas flow path 231 may neighbor (border or be adjacent to) the cooling flow path 232 in the third direction (Z) traversing (crossing) the first direction (X) and in the second direction (Y) and may directly communicate with the first vent flow path 210.

The cooling flow path 232 may be spaced from the gas flow path 231 in the third direction (Z) (e.g., the cooling flow path 232 may be above the gas flow path 231) and may extend in the first direction (X). The cooling flow path 232 may not communicate with the gas flow path 231 and the first vent flow path 210 and may be separated from the gas flow path 231 and the first vent flow path 210. The cooling flow path 232 may be disposed between the gas flow path 231 and the battery cells 100. Various types of cooling means such as cooling water may be applied to the cooling flow path 232.

The third cell barrier 233 may be disposed between the first vent flow path 210 and the gas flow path 231. The third cell barrier 233 may be disposed between the first vent flow path 210 and the gas flow path 231 and may extend in the first direction (X). The third cell barrier 233 may define the shape of the first vent flow path 210, but the present disclosure is not limited to a particular shape of the first vent flow path 210. The third cell barrier 233 may include third through-holes 233*a* spaced from each other in the first direction (X).

The third through-holes 233*a* may be a passage for connecting the first vent flow path 210 and the gas flow path 231. The third through-holes 233*a* may have various types of openings such as a circle, an oval, or a polygon shaped opening.

The barrier 234 may be disposed between the gas flow path 231 and the cooling flow path 232. The barrier 234 may be disposed between the gas flow path 231 and the cooling flow path 232 and may extend in the first direction (X). The barrier 234 may define the shapes of the gas flow path 231 and the cooling flow path 232, but the present disclosure is not limited to particular shapes of the gas flow path 231 and the cooling flow path 232. The barrier 234 separates or divides the gas flow path 231 and the cooling flow path 232 from each other in the third direction (Z).

The second cover 235 may cover the cooling flow path 232. The second cover 235 may extend in the first direction (X) and may cover the cooling flow path 232 (e.g., the second cover 235 extends in the y-x plane). The second cover 235 may support the battery cells 100. The second cover 235, the third cell barrier 233, and the barrier 234 may define the shapes of the first vent flow path 210 and the second vent flow path 230, but the present disclosure is not limited to particular shapes of the first vent flow path 210 and the second vent flow path 230.

The gas generated by the battery cell 100 in which a thermal runaway is generated or occurring from among the battery cells 100 is discharged to the outside of the battery module 1002 through the first vent flow path 210 and the second vent flow path 230 of the first module case 200.

For example, the gas generated by the battery cell 100 in which a thermal runaway is generated or occurring moves to the first vent flow path 210 from the vent portion 110 of the battery cell 100. The gas may then move in the first direction (X), may move in the second direction (Y) through the third through-holes 233*a* of the third cell barrier 233, and may move to the gas flow path 231 of the second vent flow path 230. The gas may them move in the first direction (X), may be cooled by the cooling flow path 232 separated by the barrier 234, and may be discharged to the outside of the battery module 1002. The gas generated by the vent portion 110 of the battery cell 100 in which a thermal runaway is generated or occurring may pass through the gas flow path 231 of the first vent flow path 210 and the second vent flow path 230 and may be cooled by the third cell barrier 233 and the cooling flow path 232, and the particles included in the gas may be attached (adhered) to the third cell barrier 233 and the barrier 234, may be trapped to the third cell barrier 233 and the barrier 234, and may be separated from the gas. In this manner, the gas generated by the vent portion 110 of the battery cell 100 in which a thermal runaway is generated or occurring may be easily cooled through the first vent flow path 210 and the second vent flow path 230 of the first module case 200, and the particles may be separated from the gas before the gas is discharged to the outside of the battery module 1002.

For example, the battery module 1002 for easily discharging the gas generated by the vent portion 110 of the battery cell 100 (in which a thermal runaway is generated or occurring) to the outside corresponding to the thermal runaway of the battery cells 100 and trapping the particles included in the gas may be provided.

While this disclosure has been described in connection with what is presently considered to be practical embodiments, it is to be understood that the disclosure is not limited to the disclosed embodiments, but, on the contrary, is intended to cover various modifications and equivalent arrangements included within the scope of the appended claims.

DESCRIPTION OF SYMBOLS battery cell 100, first module case 200, first vent flow path 210, second vent flow path 220

What is claimed is:

1. A battery module comprising:

a plurality of battery cells arranged in a first direction, the plurality of battery cells comprising a plurality of vent portions; and a first module case extending in the first direction and supporting the plurality of battery cells, wherein the first module case comprises:

a first vent flow path in communication with the plurality of vent portions, the first vent flow path projecting away from the plurality of battery cells and extending in the first direction, and a plurality of second vent flow paths spaced from each other in a second direction traversing the first direction, the plurality of second vent flow paths extending in the first direction to support the battery cells, and directly communicating with the first vent flow path, wherein the first vent flow path is between the plurality of second vent flow paths;

a battery insulating sheet between the plurality of battery cells and the first module case, the battery insulating sheet comprising a plurality of sheet through-holes corresponding to the plurality of vent portions;

a heat insulating sheet between the battery insulating sheet and the first module case, the heat insulating sheet being attached to the first vent flow path;

a first cover covering each second vent flow path of the plurality of second vent flow paths and supporting the battery cells, wherein the first vent flow path is uncovered by the first cover; and through-holes in the first cover facing the plurality of battery cells, the through-holes communicating with the second vent flow path, wherein the through-holes in the first cover are spaced apart from the first vent flow path in the second direction.

2. The battery module as claimed in claim 1, wherein each second vent flow path of the plurality of second vent flow paths comprises:

a first sub flow path directly communicating with the first vent flow path and extending in the first direction; and a second sub flow path spaced from the first sub flow path in the second direction, the second sub flow path extending in the first direction and directly communicating with the first sub flow path.

3. The battery module as claimed in claim 1, wherein each second vent flow path of the plurality of second vent flow paths further comprises:

a first cell barrier between the first vent flow path and the first sub flow path, and wherein the first cell barrier comprises first through-holes connecting the first vent flow path and the first sub flow path.

4. The battery module as claimed in claim 3, wherein each second vent flow path of the plurality of second vent flow paths further comprises:

a second cell barrier between the first sub flow path and the second sub flow path, and wherein the through-holes in the first cover are second through-holes in the second cell barrier connecting the first sub flow path and the second sub flow path.

5. The battery module as claimed in claim 4, wherein the first through-holes do not overlap the second through-holes in the second direction.

6. The battery module as claimed in claim 2, wherein the first cover covers the first sub flow path and the second sub flow path.

7. The battery module as claimed in claim 1, wherein each second vent flow path of the plurality of second vent flow paths comprises:

a gas flow path directly communicating with the first vent flow path and extending in the first direction, and a cooling flow path spaced from the gas flow path in a third direction traversing the first direction and the second direction, extending in the first direction, and not communicating with the first vent flow path and the gas flow path.

8. The battery module as claimed in claim 7, wherein the cooling flow path is between the gas flow path and the plurality of battery cells.

9. The battery module as claimed in claim 7, wherein each second vent flow path of the plurality of second vent flow paths further comprises a third cell barrier between the first vent flow path and the gas flow path, and wherein the third cell barrier comprises third through-holes connecting the first vent flow path and the gas flow path.

10. The battery module as claimed in claim 7, wherein each second vent flow path of the plurality of second vent flow paths further comprises a barrier between the gas flow path and the cooling flow path, and wherein the barrier separates the gas flow path and the cooling flow path.

11. The battery module as claimed in claim 7, wherein each second vent flow path of the plurality of second vent flow paths further comprises a second cover covering the cooling flow path and supporting the battery cells.

12. The battery module as claimed in claim 1, further comprising a second module case coupled to the first module case, and wherein the plurality of battery cells are between the first module case and the second module case.

13. The battery module as claimed in claim 12, further comprising a heat transmitting sheet between the plurality of battery cells and the second module case.

14. The battery module as claimed in claim 12, further comprising a first end plate and a second end plate coupled to the first module case and the second module case, and wherein the plurality of battery cells are between the first end plate and the second end plate.

15. The battery module as claimed in claim 14, wherein one of the first end plate or the second end plate includes a first module vent portion communicating with one of the plurality of second vent flow paths, and the other of the first end plate or the second end plate includes a second module vent portion communicating with another of the plurality second vent flow paths.

16. The battery module as claimed in claim 1, wherein the plurality of battery cells further comprises long sides and short sides, and the plurality of vent portions are on the long sides of the plurality of battery cells.

17. The battery module as claimed in claim 16, wherein the plurality of battery cells further comprises terminals on the short sides of the plurality of battery cells, and wherein the battery module further comprises a busbar connecting the terminals of the plurality of battery cells.

18. The battery module as claimed in claim 17, further comprising a busbar cover covering the busbar.

* * * * *